(12) United States Patent
Yu

(10) Patent No.: US 8,705,227 B2
(45) Date of Patent: Apr. 22, 2014

(54) LATCHING MECHANISM, WRIST REST AND KEYBOARD ASSEMBLY

(75) Inventor: Wen-Hua Yu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 61 days.

(21) Appl. No.: 13/523,949

(22) Filed: Jun. 15, 2012

(65) Prior Publication Data

US 2013/0120923 A1 May 16, 2013

(30) Foreign Application Priority Data

Nov. 15, 2011 (CN) .......................... 2011 1 0361344

(51) Int. Cl.
*G06F 1/16* (2006.01)
*B41J 29/00* (2006.01)
*B68G 5/00* (2006.01)
*B43L 15/00* (2006.01)

(52) U.S. Cl.
USPC ............ 361/679.19; 361/679.55; 361/679.58; 400/715; 248/118; 248/118.1

(58) Field of Classification Search
USPC ............. 361/679.01–679.45, 679.55–679.59; 312/223.1, 223.2; 345/168, 169, 905; 248/118, 118.1, 118.3
See application file for complete search history.

(56) References Cited

U.S. PATENT DOCUMENTS

| | | | | | |
|---|---|---|---|---|---|
| 5,660,360 | A | * | 8/1997 | Yang | 248/118 |
| 5,677,827 | A | * | 10/1997 | Yoshioka et al. | 361/679.58 |
| 5,826,839 | A | * | 10/1998 | Chen | 248/118 |
| 5,904,327 | A | * | 5/1999 | Cheng | 248/118.1 |
| 6,179,254 | B1 | * | 1/2001 | Min-Chen | 248/118.1 |
| 6,478,266 | B1 | * | 11/2002 | Tsau | 248/118.1 |
| 2008/0055840 | A1 | * | 3/2008 | Tanaka et al. | 361/683 |

* cited by examiner

*Primary Examiner* — Jayprakash N Gandhi
*Assistant Examiner* — Nidhi Desai
(74) *Attorney, Agent, or Firm* — Novak Druce Connolly Bove + Quigg LLP

(57) ABSTRACT

A latching mechanism for latching a wrist rest to a keyboard defining two latching holes, includes an actuating member slidably coupled to the wrist rest, and two hook members rotatably coupled to the wrist rest. The actuating member includes an abutting post, sliding between an unlatching position extending out of the wrist rest and a latching position hidden in the wrist rest. When the wrist rest contacts the front sidewall, the actuating member slides to the latching position, the hook members extend out of the wrist rest; when the actuating member returns to the unlatching position, the hook members disengage from the latching hole to retract into the wrist rest. A wrist rest and a keyboard assembly having the latching mechanism are also provided.

20 Claims, 5 Drawing Sheets

LATCHING MECHANISM, WRIST REST AND KEYBOARD ASSEMBLY

BACKGROUND

1. Technical Field

The present disclosure relates to keyboard assembly, and particularly to a keyboard assembly having a wrist rest, a keyboard and a latching mechanism for latching the wrist rest to the keyboard.

2. Description of Related Art

Desktop computer generally has a keyboard for receiving inputs from a user. A wrist rest corresponding to the keyboard is provided to comfortably support the wrist of a user. The wrist rest is secured to the keyboard with screws, which is inconvenient when being assembled to and disassembled from the keyboard.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the six views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
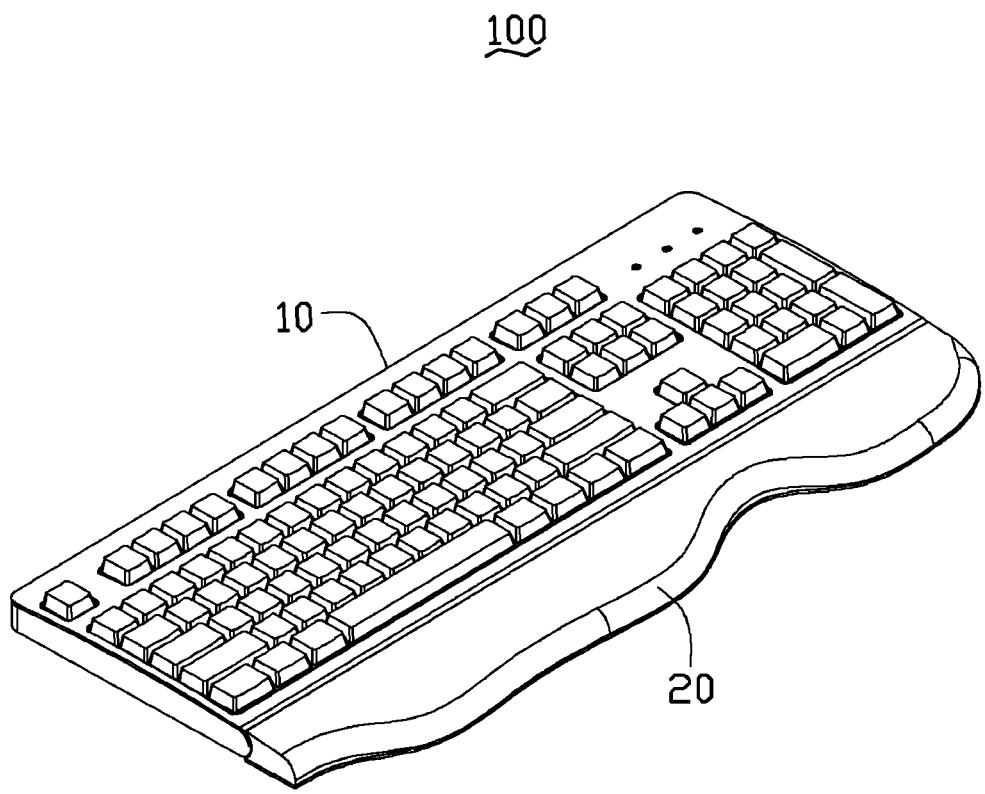
FIG. 1 is a perspective view of a keyboard assembly including a keyboard and a wrist rest latched to the keyboard in accordance with an embodiment.
Figure 2:
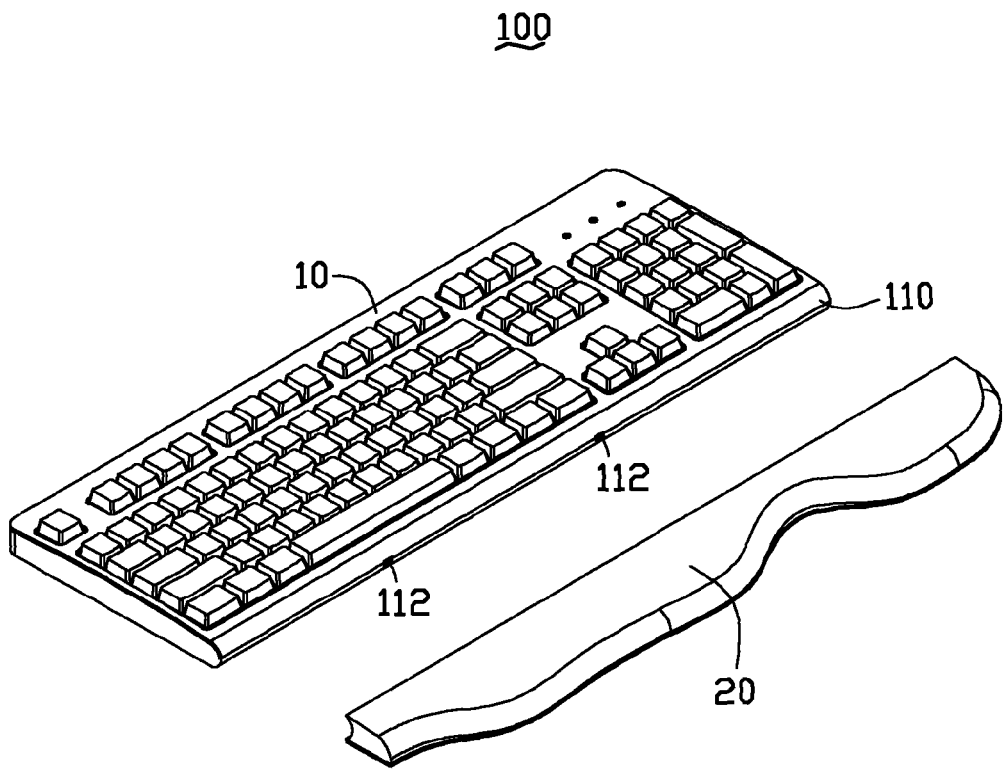
FIG. 2 is a perspective view of the keyboard assembly of FIG. 1 with the wrist rest disengaging from the keyboard.
Figure 3:
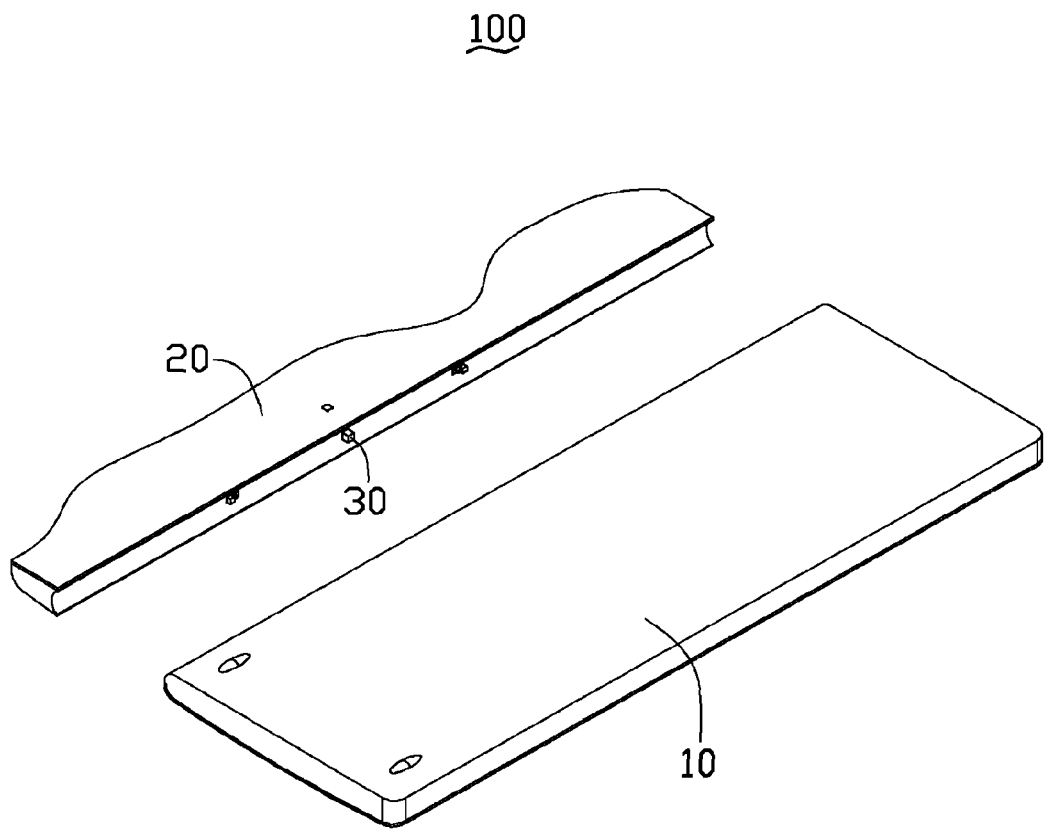
FIG. 3 is similar to FIG. 2, but viewed from another aspect.

FIGS. 1-3, is a perspective view of a keyboard assembly 100 in accordance with an embodiment. The keyboard assembly 100 includes a keyboard 10, a wrist rest 20 and a latching mechanism 30 for latching the wrist rest 20 to the keyboard 10. The wrist rest 20 is secured to the keyboard 10 to support the wrist of the user during operation of the keyboard 10. The wrist rest 20 is designed in accordance with rules of ergonomics, being more comfortable for the users when operating the keyboard 10.

The keyboard 10 is applied to desktop computers in the embodiment. The keyboard 10 is substantially rectangular, and includes four sidewalls. One of the sidewalls facing the user is referred herein as the front sidewall 110. The front sidewall 110 defines two latching holes 112. The latching holes 112 are evenly spaced from each other.

Figure 4:
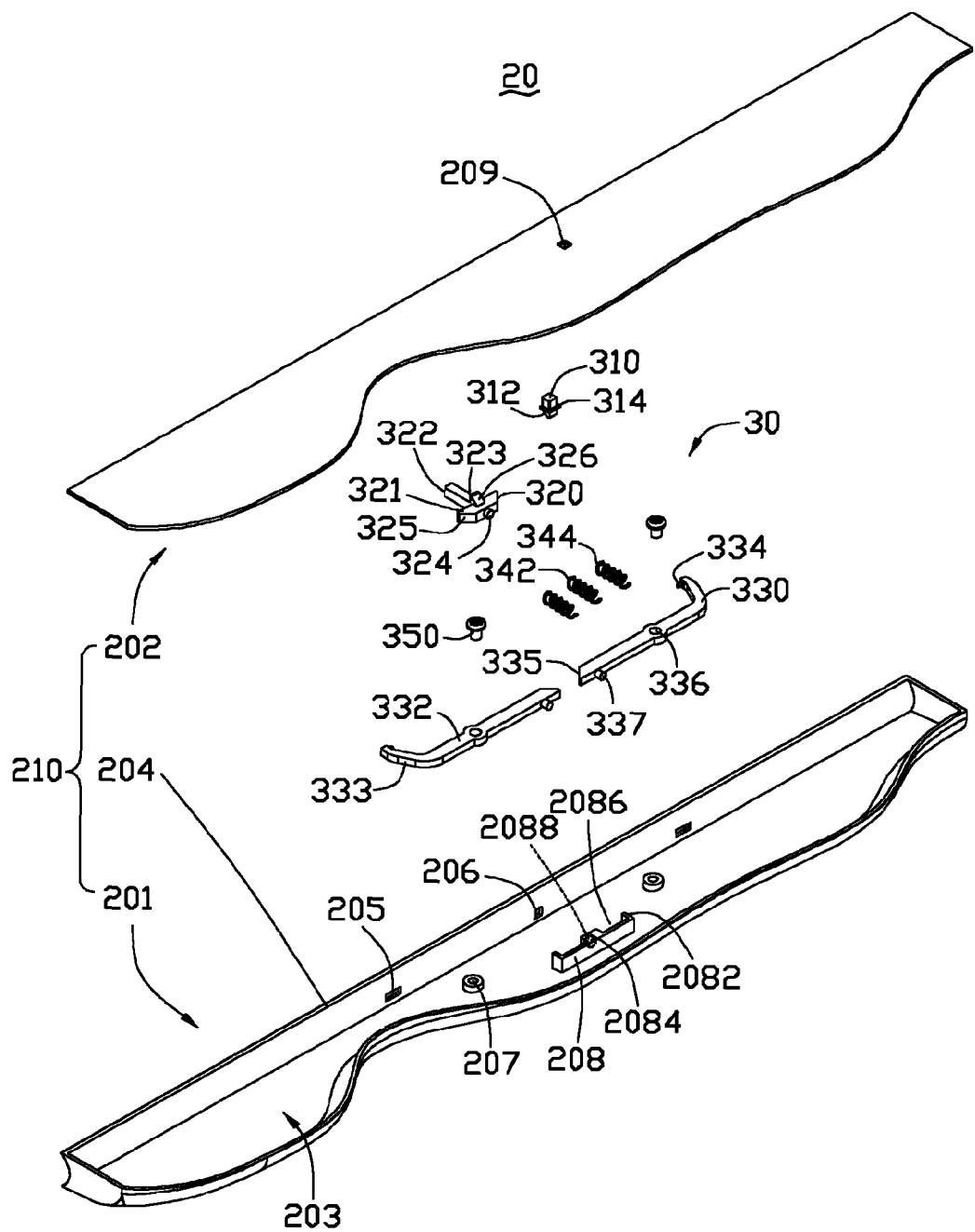
FIG. 4 is a disassembled view of the wrist rest in FIG. 1.

FIG. 4, illustrates the wrist rest 20 including a top wall 201, a bottom wall 202 and a plurality of end portions. One of the end portions corresponding to front sidewall 110 is referred herein as the front end portion 204. The top wall 201, the bottom wall 202 and the end portions cooperatively form a housing 210 of the wrist rest 20. The housing 210 defines a receiving space 203 for receiving the latching mechanism 30.

The front end portion 204 defines two elongated holes 205 and a through hole 206. The elongated hole 205 corresponds to the latching holes 112. The through hole 206 is arranged between the elongated holes 205. In the embodiment, the through hole 206 is collinear with the elongated holes 205, and is located at the middle of a line connecting the elongated holes 205.

Two bearings 207 are secured to an inner surface of the top wall 201. The vertical projections of the bearings 207 in the front end portion 204 are arranged at opposite sides of the through hole 206 and between the elongated holes 205. A positioning member 208 is secured to the inner surface of the top wall 201. The positioning member 208 is substantially parallel to the front end portion 204 and is arranged between the bearings 207. The distance between the bearings 207 and the front end portion 204 is less than the distance between the positioning member 208 and the front end portion 204. Two stoppers 2082 and a protrusion 2084 are arranged on a surface of the positioning member 208 facing the front end portion 204. The stoppers 2082 perpendicularly bend from opposite ends of the positioning member 208 and extend toward the front end portion 204. The protrusion 2084 is arranged at the middle of the positioning member 208 and is arranged between the stoppers 2082. The protrusion 2084 cooperates with each stopper 2082 to define a receiving portion 2086. The protrusion 2084 defines a receiving portion 2086 corresponding to the through hole 206. The bottom wall 202 defines an aperture 209. The vertical projection of the aperture 209 in the top wall 201 is collinear with the through hole 206 and the receiving hole 2088.

The latching mechanism 30 is housed in the receiving space 203. The latching mechanism 30 is capable of being latched to the latching hole 112 to latch the wrist rest 20 to the keyboard 10, and is capable of being unlatched from the latching hole 112 for allowing the wrist rest 20 to be disengaged from the keyboard 10. The latching mechanism 30 includes an operating member 310, an actuating member 320, two hook members 330, and three elastic members (hereinafter, a first elastic member 342 and two second elastic members 344).

The operating member 310 is slidably received in the aperture 209. An end of the operating member 310 defines a first inclined surface 312. A protruding portion 314 protrudes from the operating member 310. The size of the protruding portion 314 is greater than the size of the aperture 209, to prevent the operating member 310 from moving away from the wrist rest 30.

The actuating member 320 includes an abutting post 322, a first actuating portion 321 fixed to an end of the abutting post 322, a tip 324 fixed to an end of the first actuating portion 321 opposite to the abutting post 322, and a second actuating portion 323. The second actuating portion 323 is located at a junction of the abutting post 322 and the first actuating portion 321. The second actuating portion 323 defines a second inclined surface 326 corresponding to the first inclined surface 312 and opposite to the front end portion 204. The cross-section of the first actuating portion 321 is substantially trapezoid, and the first actuating portion 321 defines two first slanted surface 325 opposite to the front end portion.

The hook members 330 are rotatably coupled to the bearings 207 respectively. Each hook member 330 is substantially L-shaped, and includes a rotating arm 332 and a hook arm 333 bending from an end of the rotating arm 332. Each rotating arm 332 defines a pivot hole 336 for receiving a fixing member 350, such as a screw. An end of the rotating arm 332 away from the hook arm 333 defines a second slanted surface 335. The second slanted surfaces 335 correspond to the first slanted surface 325 respectively. A projection 337 protrudes from an end of the rotating arm 332 adjacent to the second slanted surface 335. The projection 337 and the hook arm 333 are arranged at opposite sides of the rotating arm 332. A hook 334 is arranged at an inner side of the hook arms 333 adjacent to the second slanted surface 335. The two hooks 334 face each other.

In this embodiment, the first and second elastic members 342, 344 are springs. An end of the first elastic member 342 is received in the receiving hole 2088, and the other end of the first elastic member 342 is secured to the tip 324. Opposite ends of the second elastic members 344 are respectively secured to the projections 337 and the receiving portions 2086.

Figure 5:
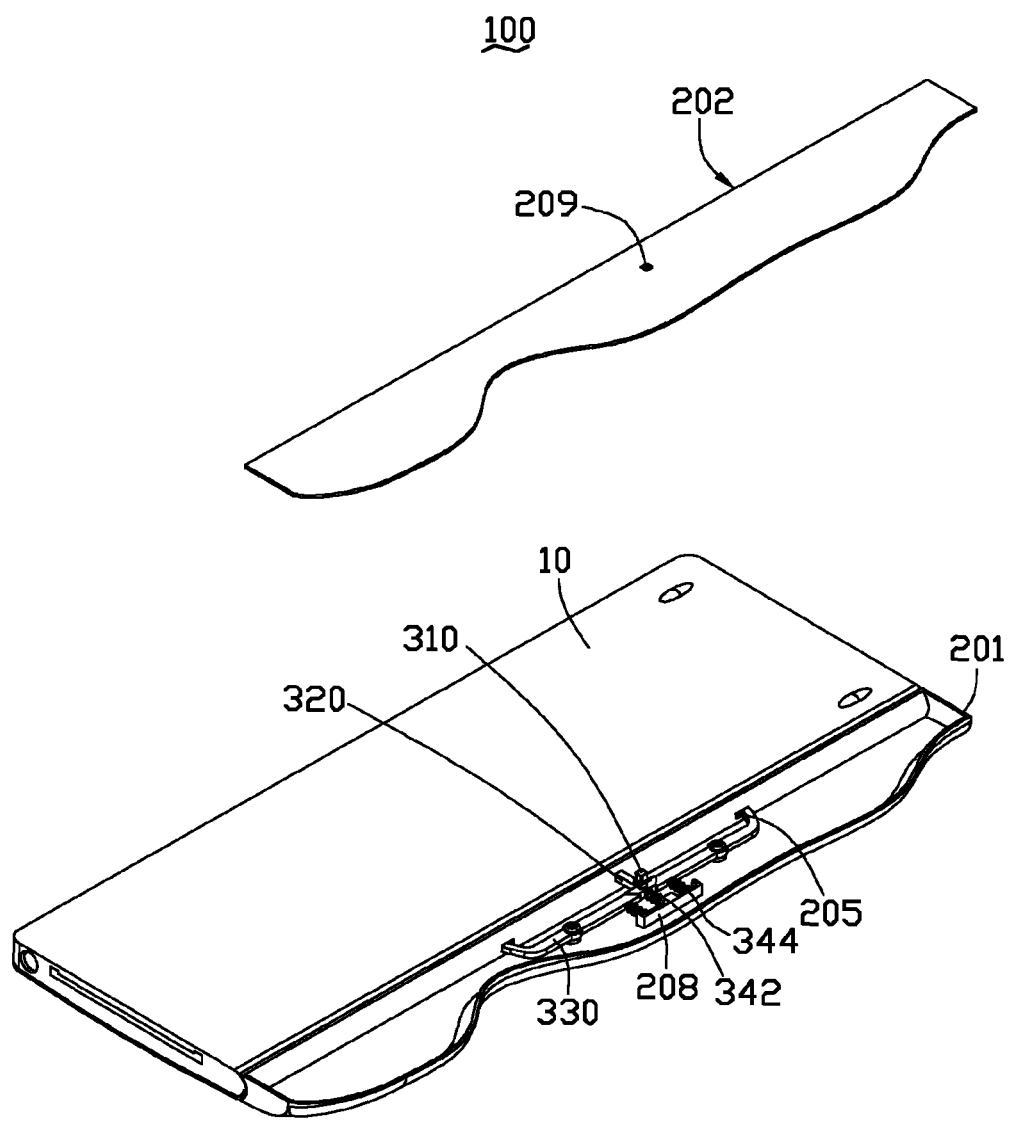
FIG. 5 is a perspective view showing the partially assembled wrist rest being latched to the keyboard of FIG. 1.

FIG. 5, illustrates in assembly, first the hook members 330 are rotatably coupled to the bearings 207 with the fixing members 350 respectively. Second, the abutting post 322 is slidably received in the through hole 206, and the first actuating portion 321 abuts ends of the hook member 330 with the first slanted surface 325 engaging with the second slanted surface 335. Third, an end of the first elastic member 342 is received in the receiving hole 2088, and the other end of the first elastic member 342 is secured to the tip 324; opposite ends of the second elastic members 344 are respectively secured to the projections 337 and the receiving portions 2086. Finally, the operating member 310 is slidably received in the aperture 209 with the first inclined surface 312 abutting the second inclined surface 326, and the bottom wall 202 is secured to the top wall 201.

After assembly, when the actuating member 322 is released, the first elastic member 342 drives the first actuating portion 321 to abut the inner surface of the front end portion 204, and the second elastic members 344 drive the second slanted surfaces 335 to abut the corresponding first slanted surfaces 325. At this time, the actuating member 322 is in an unlatching position, the actuating post 322 extends out of the through hole 206, the operating member 310 is hidden in the aperture 209, the hooks 334 retract into the elongated holes 205, and the wrist rest 20 may be unlatched from the keyboard 10.

FIG. 5, illustrates latching the wrist rest 20 to the keyboard 10: the front end portion 204 of the wrist rest 20 is operated to contact the front sidewall 110 of the keyboard 10, and the actuating post 322 of the actuating member 320 is pressed by the front sidewall 110 and is driven to retract into the through hole 206. At the same time, the actuating member 320 slides to a latching position and deforms the first elastic member 342; the operating member 310 is driven by the actuating member 320 to extend out of the aperture 209, and the hook members 330 are driven by the actuating member 320 to rotate relative to the bearings 207 with the projections 337 moving away from the front end portion 204 to deform the second elastic members 344. As a result, the hooks 334 rotate to extend out of the elongated hole 205 latching to the latching holes 112.

To unlatch the wrist rest 20 from the keyboard 10: the operating member 310 is pressed, and the actuating member 320 is driven, extending out of the through hole 206 via the first inclined surface 312 engaging with the second inclined surface 326, at the same time, the second elastic members 344 drives the hook members 330 to rotate relative to the bearings 297 with the projections 337 moving toward the front end portion 204 and the hooks 334 disengaging from the latching holes 112 to further retract into the elongated holes 205. As a result, the wrist rest 20 is unlatched from the keyboard 10.

It is to be understood, even though information as to, and advantages of, the present embodiments have been set forth in the foregoing description, together with details of the structures and functions of the present embodiments, the disclosure is illustrative only; and that changes may be made in detail, especially in the matters of shape, size, and arrangement of parts within the principles of the present embodiments to the full extent indicated by the broad general meaning of the terms in which the appended claims are expressed.

What is claimed is:

1. A latching mechanism for latching a wrist rest to a keyboard, the keyboard comprising a front sidewall defining two latching holes, the latching mechanism comprising:
    an actuating member slidably coupled to the wrist rest, the actuating member comprising an abutting post, the actuating member capable of sliding between an unlatching position with the abutting post extending out of the wrist rest and a latching position with the abutting post being hidden in the wrist rest; and
    two hook members abutting an end of the actuating member away from the abutting post and capable of being driven by the actuating member to rotate relative to the wrist rest, each hook member comprising a hook, the hooks capable of extending out of the wrist rest to be latched to the latching holes when the hook members rotate;
    wherein when the wrist rest contacts the front sidewall, the actuating member is driven by the front sidewall to slide from the unlatching position to the latching position, the hook members are driven by the actuating member to rotate with the hooks extending out of the wrist rest to be latched to the latching holes; when the actuating member slides from the latching position to the unlatching position, the hook members is allowed to rotate with the hooks disengaging from the latching hole to retract into the wrist rest.

2. The latching mechanism of claim 1, wherein the actuating member further comprises a first actuating portion secured to an end of the abutting post, an end of the actuating portion away from the abutting post defines two first slanted surfaces opposite to the front end portion.

3. The latching mechanism of claim 2, wherein an end of each hook member away from the hook defines a second slanted surface, the two second slanted surfaces engage with the first slanted surfaces respectively.

4. The latching mechanism of claim 2, further comprising an operating member abutting the actuating member, wherein the operating member drives the actuating member to slide from the latching position to the unlatching position when pressed.

5. The latching mechanism of claim 4, wherein the actuating member further comprises a second actuating portion, the operating member defines a first inclined surface abutting the second actuating portion.

6. The latching mechanism of claim 2, further comprising a first elastic member abutting an end of the first actuating portion opposite to the abutting post, wherein the first elastic member drives the actuating member to slide to the unlatching position when the actuating member is released.

7. The latching mechanism of claim 1, further comprising two second elastic members abutting ends of the hook members away from the hooks, wherein the two elastic members drive the hook members to abut the actuating member to slide to the unlatching position when the actuating member is released.

8. The latching mechanism of claim 1, wherein the wrist rest comprises a first end portion corresponding to the front sidewall, the front end portion defines two elongated holes corresponding to the two latching holes and a through hole arranged between the elongated holes and used for slidably receiving the abutting post; the elongated holes allow the hooks to be extending out of the wrist rest.

9. A wrist rest applied to a keyboard, the keyboard comprising a front sidewall defining two latching holes, the wrist rest comprising:
   a housing having a front end portion; and
   a latching mechanism housed in the housing and used for latching the wrist rest to the keyboard, the latching mechanism comprising an actuating member slidably coupled to the front end portion, and two hook members abutting an end of the actuating member away from the abutting post and capable of being driven by the actuating member to rotate relative to the housing, each hook member comprising a hook, the hooks capable of extending out of the housing to be latched to the latching holes when the hook members rotate;
   wherein the actuating member comprises an abutting post, the actuating member is capable of sliding between an unlatching position with the abutting post extending out of the housing and a latching position with the abutting post being hidden in the housing; when the front end portion contacts the front sidewall, the actuating member is driven by the front sidewall to slide from the unlatching position to the latching position, the hook members are driven by the actuating member to rotate with the hooks extending out of the housing to be latched to the latching holes; when the actuating member slides from the latching position to the unlatching position, the hook members is allowed to rotate with the hooks disengaging from the latching hole to retract into the housing.

10. The wrist rest of claim 9, wherein the actuating member further comprises a first actuating portion secured to an end of the abutting post, an end of the actuating portion away from the abutting post defines two first slanted surfaces opposite to the front end portion.

11. The wrist rest of claim 10, wherein the latching mechanism further comprises an operating member abutting the actuating member, the operating member drives the actuating member to slide from the latching position to the unlatching position when pressed.

12. The wrist rest of claim 11, wherein the actuating member further comprises a second actuating portion, the operating member defines a first inclined surface abutting the second actuating portion.

13. The wrist rest of claim 10, wherein the latching mechanism further comprises a first elastic member abutting an end of the first actuating portion opposite to the abutting post, the first elastic member drives the actuating member to slide to the unlatching position when the actuating member is released.

14. The wrist rest of claim 9, wherein the latching mechanism further comprises two second elastic members abutting ends of the hook members away from the hooks, the two elastic members drive the hook members to abut the actuating member to slide to the unlatching position when the actuating member is released.

15. The wrist rest of claim 9, wherein the front end portion defines two elongated holes corresponding to the two latching holes and a through hole arranged between the elongated holes and used for slidably receiving the abutting post; the elongated holes allow the hooks to be extending out of the wrist rest.

16. A keyboard assembly, comprising:
   a keyboard comprising a front sidewall, the front sidewall defining two latching holes;
   a wrist rest capable of being latched to and unlatched from the keyboard; and
   a latching mechanism housed in the wrist rest and used for latching the wrist rest to the keyboard, the latching mechanism comprising an actuating member slidably coupled to wrist rest, and two hook members abutting an end of the actuating member away from the abutting post and capable of being driven by the actuating member to rotate relative to the wrist rest, each hook member comprising a hook, the hooks capable of extending out of the wrist rest to be latched to the latching holes when the hook members rotate;
   wherein the actuating member comprises an abutting post, the actuating member is capable of sliding between an unlatching position with the abutting post extending out of the wrist rest and a latching position with the abutting post being hidden in the wrist rest; when wrist rest contacts the front sidewall, the actuating member is driven by the front sidewall to slide from the unlatching position to the latching position, the hook members are driven by the actuating member to rotate with the hooks extending out of the wrist rest to be latched to the latching holes; when the actuating member slides from the latching position to the unlatching position, the hook members is allowed to rotate with the hooks disengaging from the latching hole to retract into the wrist rest.

17. The keyboard assembly of claim 16, wherein the actuating member further comprises a first actuating portion secured to an end of the abutting post, an end of the actuating portion away from the abutting post defines two first slanted surfaces opposite to the front end portion.

18. The keyboard assembly of claim 17, wherein the latching mechanism further comprises an operating member abutting the actuating member, the operating member drives the actuating member to slide from the latching position to the unlatching position when pressed.

19. The keyboard assembly of claim 17, wherein the latching mechanism further comprises a first elastic member abutting an end of the first actuating portion opposite to the abutting post, the first elastic member drives the actuating member to slide to the unlatching position when the actuating member is released.

20. The keyboard assembly of claim 16, wherein the latching mechanism further comprises two second elastic members abutting ends of the hook members away from the hooks, the two elastic members drive the hook members to abut the actuating member to slide to the unlatching position when the actuating member is released.

* * * * *